(No Model.)  T. L. SMITH & P. W. POST.  5 Sheets—Sheet 1.
CARVING MACHINE.
No. 443,802. Patented Dec. 30, 1890.
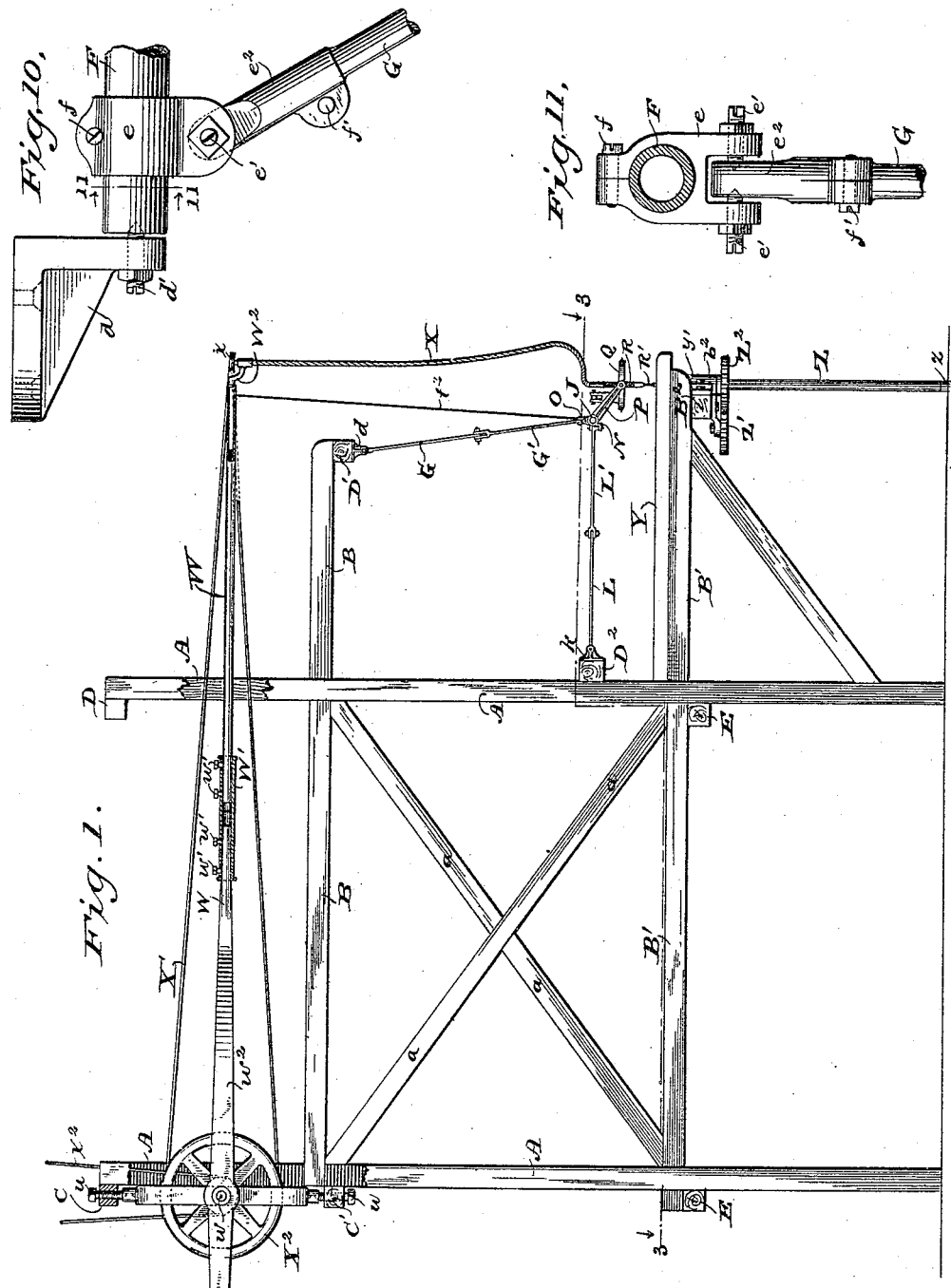
Witnesses
Geo. W. Young
N. E. Oliphant
Inventors
Thomas L. Smith
Paul W. Post
By Stout & Underwood
Attorneys (No Model.) 5 Sheets—Sheet 2.
T. L. SMITH & P. W. POST.
CARVING MACHINE.
No. 443,802. Patented Dec. 30, 1890.
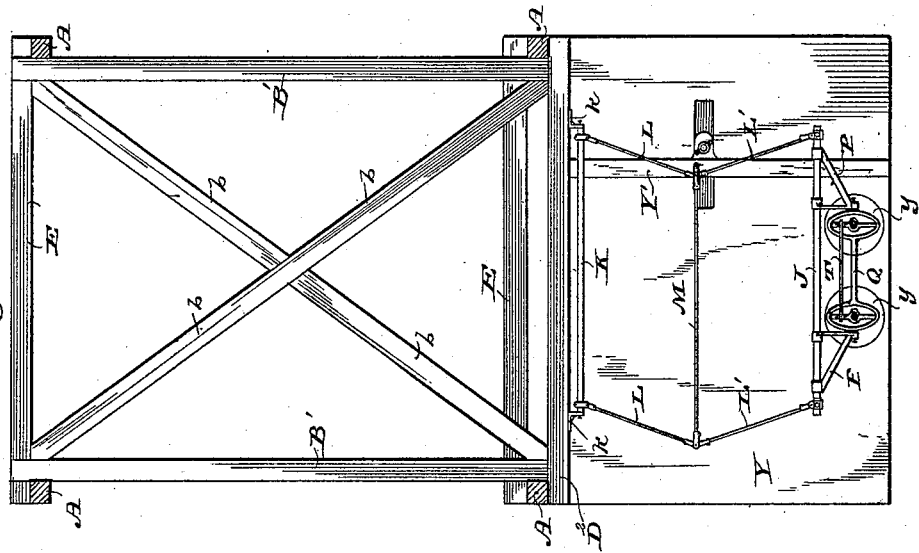
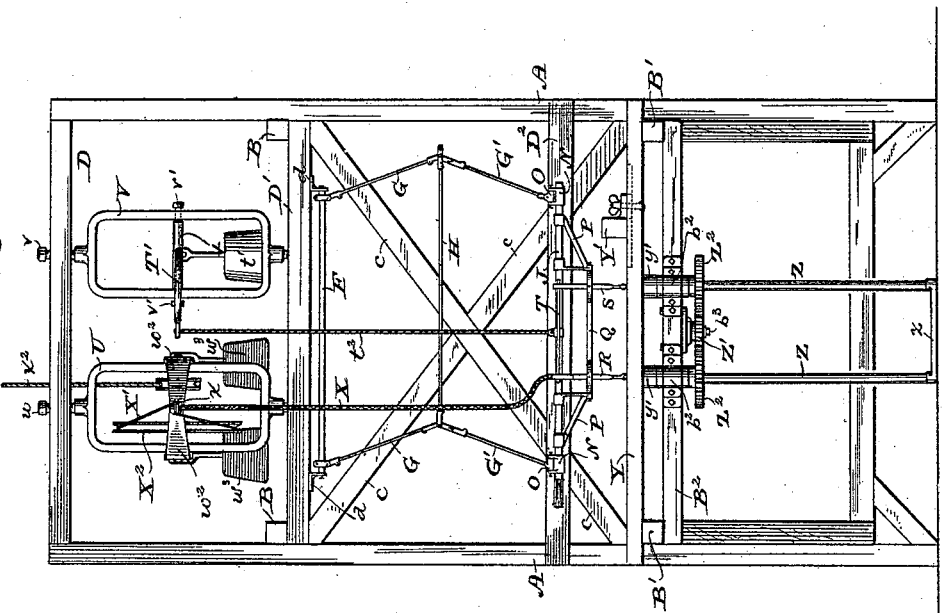
Witnesses
Geo. W. Young.
N. E. Oliphant.
Inventors
Thomas L. Smith
Paul W. Post
By Stout & Underwood
Attorneys (No Model.) 5 Sheets—Sheet 3.
T. L. SMITH & P. W. POST.
CARVING MACHINE.
No. 443,802. Patented Dec. 30, 1890.
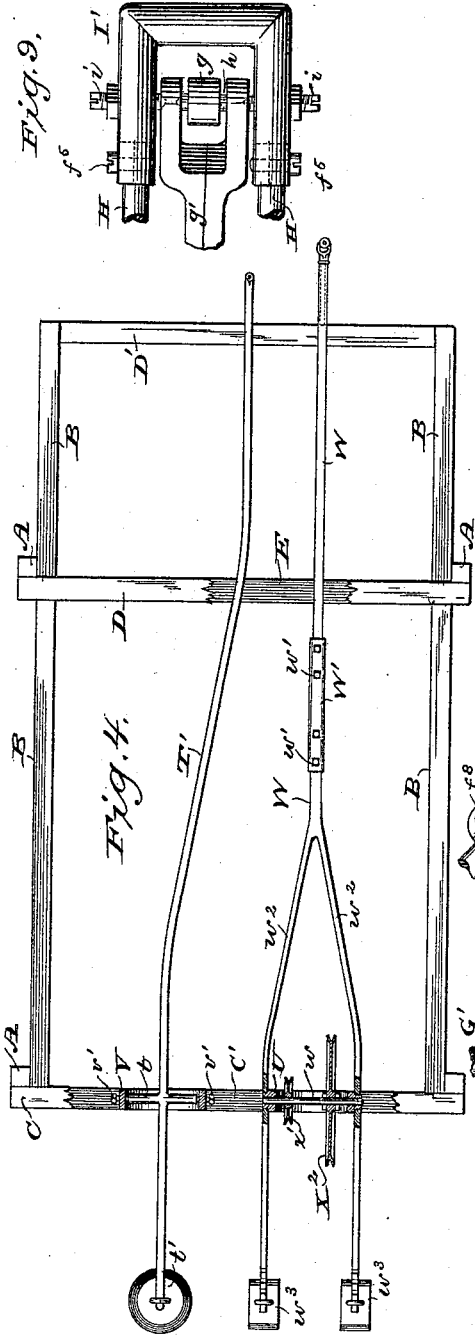
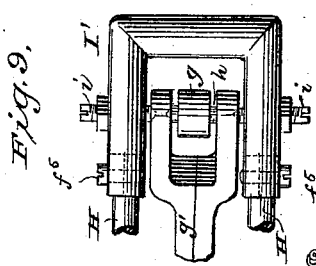
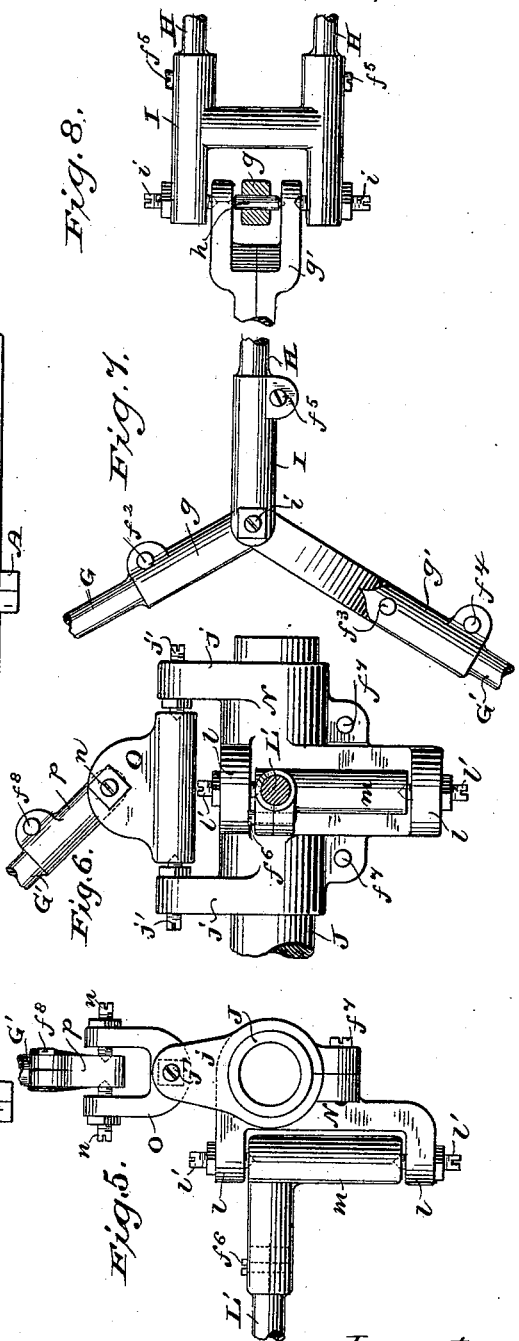
Witnesses
Geo. W. Young.
N. E. Oliphant
Inventors
Thomas L. Smith
Paul W. Post
By Stout & Underwood
Attorneys (No Model.) 5 Sheets—Sheet 4.

T. L. SMITH & P. W. POST.
CARVING MACHINE.

No. 443,802. Patented Dec. 30, 1890.

Witnesses
Geo. W. Young.
N. E. Oliphant

Inventors.
Thomas L. Smith
Paul W. Post
By Stout & Underwood
Attorneys

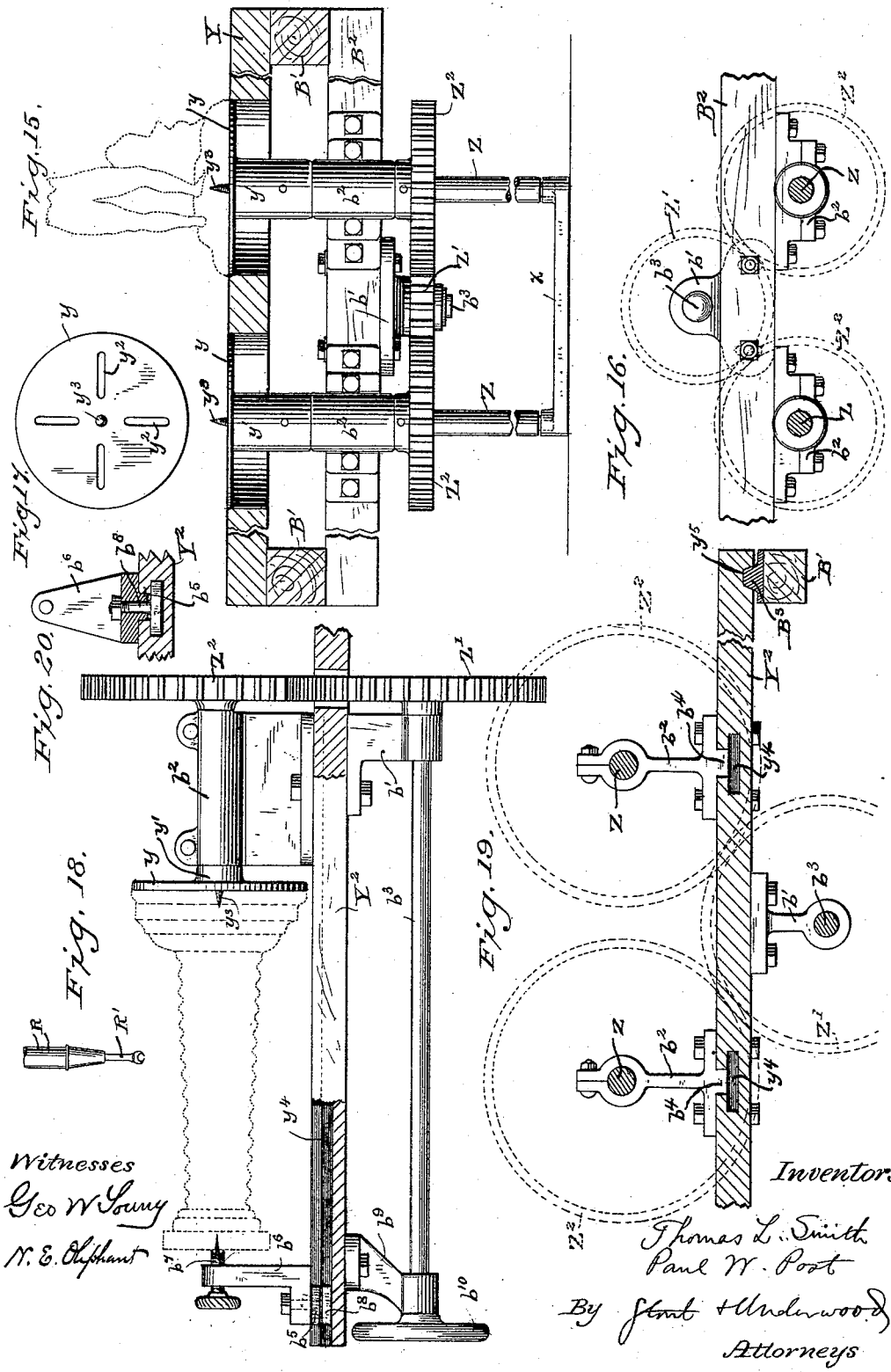

UNITED STATES PATENT OFFICE.

THOMAS L. SMITH AND PAUL W. POST, OF REEDSBURG, WISCONSIN.

CARVING-MACHINE.

SPECIFICATION forming part of Letters Patent No. 443,802, dated December 30, 1890.

Application filed October 3, 1887. Serial No. 251,298. (No model.)

*To all whom it may concern:*

Be it known that we, THOMAS L. SMITH and PAUL W. POST, of Reedsburg, in the county of Sauk, and in the State of Wisconsin, have invented certain new and useful Improvements in Carving-Machines; and we do hereby declare that the following is a full, clear, and exact description thereof.

Our invention relates to carving and cutting machines; and it consists of certain mechanism and combination of parts whereby any object of a size within the limits of the machine may be exactly reproduced mechanically from a block of raw material and without the employment of skilled labor, all as will be fully set forth hereinafter, and pointed out in the claims.

Figure 12:
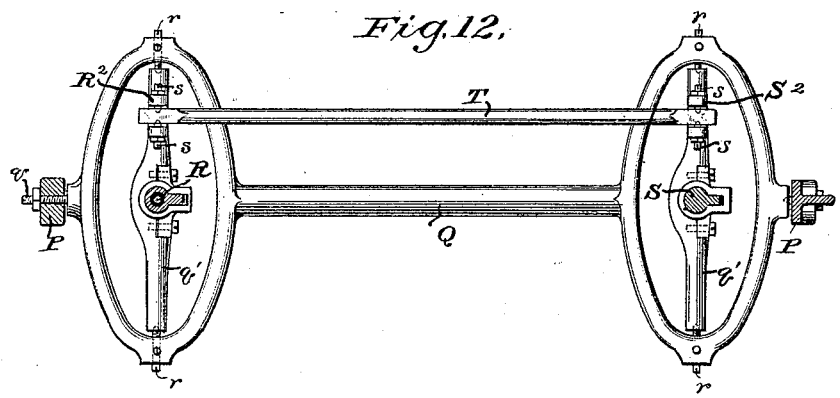
Figure 13:
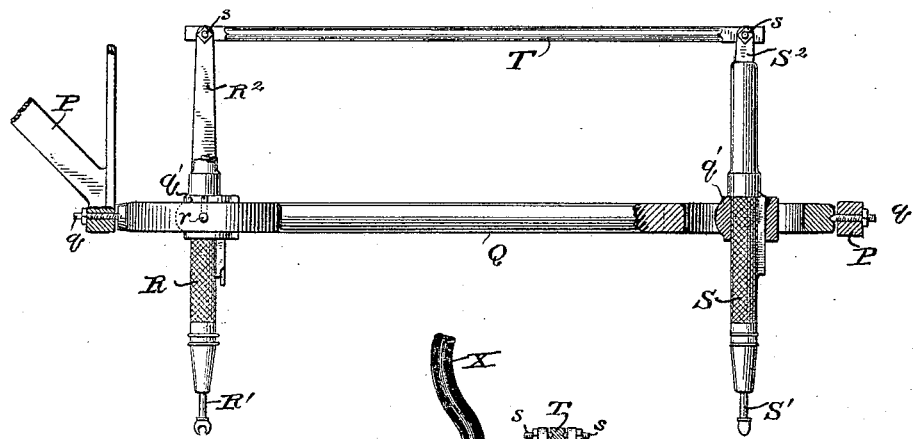
Figure 14:
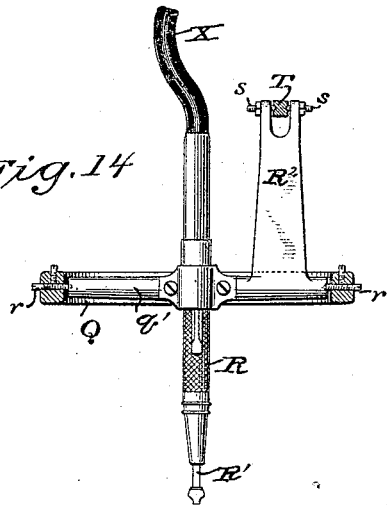

In the drawings, Figure 1 is a side elevation of our machine. Fig. 2 is a front elevation of the same. Fig. 3 is a plan view of the lower part of the machine below the section line 3 3 in Fig. 1. Fig. 4 is a plan view, partly broken away, of the upper part of the machine, showing only the driving and counterbalancing mechanism and omitting the guiding and cutting mechanism. Figs. 5 to 11, inclusive, are detail views illustrating pivot-joints of the machine. Figs. 12, 13, and 14 are detail views illustrating the guiding and cutting tools and their connections. Figs. 15, 16, and 17 are details showing the construction of the operating-table; and Figs. 18, 19, and 20 are similar views showing a modified construction for special work.

A A represent the vertical timbers of the supporting-frame of our machine, and B B' the longitudinal horizontal timbers, while C C', D D' D$^2$, and E E are the main transverse horizontal timbers, in addition to which this supporting-frame is thoroughly braced, as shown, by the crossed pieces $a$ $a$, $b$ $b$, and $c$ $c$, and others not lettered, as strength and steadiness are essential.

To the under side of the projecting front ends of the upper longitudinal timbers B B is secured the cross-timber D', and to the under side of this timber are fastened brackets $d$ $d$, in the lower arms of which are the screws $d'$, having conical bearing-points which fit into corresponding countersinks in the ends of the wall-rod F and thereby support the same, as clearly shown in the detail view, Fig. 10. This wall-rod F is preferably a hollow brass pipe having its ends closed by brass plugs soldered therein and the described countersinks made in said plugs. Clips $e$ $e$ are rigidly attached to this wall-rod F, (as by saw-cutting through the upper ends of said clips and drawing the two edges together by a clamping-screw $f$ or by soldering, or by both,) and the lower ends of these clips are bifurcated and carry bearing-screws $e'$ $e'$, (preferably like the screws $d'$, just described,) which find corresponding countersunk bearings in the opposite sides of a small brass casting $e^2$, whose lower part is hollow, to receive one end of a rod G, secured therein in any suitable manner, as by a saw-cut through a boss on the lower end of the casting and clamping-screw $f'$, as shown in detail in Fig. 10 and the detail view, Fig. 11, (taken on the line 11 11 of Fig. 10,) or by soldering, or both. There being two clips $e$, there are of course two rods G, which we term "side rods," and which are best shown in Fig. 2, and which are jointed to two other side rods G' G' and a double central cross-rod H H, the connection being shown in detail in Figs. 7, 8, and 9, as follows: The lower ends of side rods G G are each fitted to castings $g$, (in similar manner to their union with castings $e^2$, as by soldering or saw-cut and clamping-screws $f^2$, or both,) and the free ends of these castings $g$ each carry a double-pointed pin $h$ rigid therein, while the upper ends of the side rods G' G' are each provided with a peculiar casting $g'$, the upper ends of which castings are bifurcated and split and provided with interior countersinks, so as to enable these ends to be sprung over the conical points of the double-pointed pins $h$, and with exterior countersinks in line with the interior ones to receive the conical points of the screws $i$ $i$ of the end pieces I and I' of the double central cross-rod H H, the said upper split portions of said castings $g'$ being further held together by the clamping-screws $f^3$, while the lower ends of said castings, which receive the side rods G', may be saw-cut and clamped by the screws $f^4$ or soldered to the said side rods, or both, and each pipe H' of the double central cross-rod H H is similarly united to the adjacent ends of the end pieces I and I', as indicated at $f^5$.

In all of the detail views where the conical pointed bearing-screws are shown we have also shown jam-nuts, (not lettered,) which are necessary to keep the screws from turning.

The lower ends of the side rods G' G' are connected, as hereinafter described, to the tool-rod J, and the parts thus described, consisting of the wall-rod F, side rods G G, central double cross-rod H H, side rods G' G', tool-rod J, and their jointed connections, constitute a parallel motion, which we term our "vertical parallel motion," and we have also a horizontal parallel motion, consisting of the wall-rod K, (which is connected by brackets $k\ k$ to the face of cross timber $D^2$,) side rods L L, double central cross-rod M, side rods L' L', and the said tool-rod J, and the two described parallel motions are precisely alike in construction and arrangement, with the exception of the manner in which the said two motions are connected to the common tool-rod, which will now be described. This connection is best illustrated in the detail views, Figs. 5 and 6. The tool-rod J is preferably a pipe, which carries near each end a casting N, each having upward-extending lugs $j\ j$ and horizontally-extending lugs $l\ l$, the former to receive the swivel-piece O and the latter to receive the right-angled casting $m$, whose free horizontal arm receives one of the side rods L' of the horizontal parallel motion rigidly secured therein, as by saw-cut and clamping-screw $f^6$ or solder, or both, as previously described, the said casting $m$ having countersinks in each end of its vertical arm, which receive the conical points of the bearing-screws $l'\ l'$, passing through the described lugs $l\ l$. The entire lower part of the main body of the casting N is saw-cut to enable it to be firmly clasped to the tool-rod J by clamping-screws $f^7$. The swivel-piece O is practically U-shaped in transverse section, and in each end of the lower central part is a countersink to receive the conical points of the bearing-screws $j'$, which pass through the described upward-extending lugs $j$ of the casting N, while at right angles to these screws $j'$ are other bearing-screws $n\ n$, which pass through the upper side portions of the swivel-piece O, the conical points of these screws $n$ projecting into countersinks on opposite sides of the lower end of the casting $p$, whose upper end receives the lower end of one of the side rods G' of the vertical parallel motion, which rod is secured therein by saw-cut and clamping-screw $f^8$ or solder, or both, as previously described. The effect of the horizontal parallel motion is to compel the tool-rod J to be at all times parallel to the lower wall-rod K, and the effect of the vertical parallel motion is similarly to compel the said tool-rod J to be at all times parallel to the upper wall-rod F, and consequently the effect of the two combined parallel motions is to compel the said tool-rod J to be always parallel to both the wall-rods K and F, while the effect of the swivel-connection O O between the tool-rod J and the vertical parallel motion is to permit the plane of the vertical motion to assume any angle to the plane of the horizontal motion, thereby allowing perfect freedom in the movement of the tool-rod.

We will next describe the guiding and cutting tools and their connections. From the tool-rod J there depend two braced brackets P P, whose upper ends are rigidly attached to said rod, while their lower ends carry conical-pointed bearing-screws $q\ q$, which take into corresponding countersinks in the adjacent ends of a yoke Q and thereby support it. This yoke consists of two transverse ovals united by a rigid rod, as shown in Fig. 12, and each oval carries a tool-holder $q'$, supported therein by means of conical-pointed bearing-screws $r\ r$, whose points enter countersinks in the ends of said tool-holders. One of these tool-holders carries the shank or hand-piece R of the cutting-tool R', while the other carries the shank or hand-piece S of the guiding-tool S', and the said tool-holders also support upwardly-projecting arms $R^2$ and $S^2$, bifurcated at their upper ends and there receiving a cross-rod T, supported by means of conical-pointed bearing-screws $s\ s$, passing through the said upper ends of the arms $R^2$ $S^2$ and into countersinks in the cross-rod T, whereby the guiding and cutting tools are free to swing in any desired direction, but compelled to always move exactly alike and parallel to each other.

The term "tool-carriage" will be hereinafter employed to designate that part of the apparatus which is carried and controlled in its movements by the parallel motions, and which in turn carries the tool-holders. As represented in the drawings, this tool-holder consists of the connecting-rod J, by which the two parallel motions are coupled together, and the needful attachments for supporting the tool-holders and tools and permitting their movements; but the form and construction of the carriage may be considerably varied without departing from our invention—as, for instance, so constructing the tool-rod J as to make it answer the purpose it serves in our machine, as herein illustrated by drawings, and also carry the tools themselves; but we much prefer the use of brackets and yoke connected thereto, as we have shown them.

The driving and counterbalancing mechanism will now be described. Between the rear transverse timbers C and C' of the supporting-frame are located two yokes U and V, which are of generally oblong shape, with upper and lower bosses provided with countersinks to receive the conical-pointed ends of bearing-screws $u\ u$ and $v\ v$, respectively, which screws pass through the described timbers. The yoke V is provided with conical-pointed bearing-screws $v'\ v'$, passing through the upright sides of said yoke and into countersinks in the end of a cross-bar $t$, which forms an integral part of the long bent balancing-rod T', whose projecting rear end carries a weight $t'$, and to whose front end is attached one end of a cord $t^2$, whose other end is attached to the tool-rod J at the front of the machine, so that the weight $t'$ will serve to counterbalance the weight of the two parallel motions and the tool-rod J and attachments. The other yoke U has side bosses, which are perforated to receive a shaft $w$, and which are themselves received within bearings in the bifurcated rear end extensions $w^2$ of another rod W, which latter is made in two sections in front of the bifurcated portion joined by a sleeve W', so as to be adjustable in length, and secured in said adjustment by set-screws $w'$ $w'$. The front portion of this rod is tubular and loosely receives the rear end or shank of a shaft-bearing $W^2$, whose front end receives a flexible shaft X, whose lower end connects with the cutting-tool R' in similar fashion to the flexible shafts of dental engines, while the upper end of said shaft is connected to a pulley $x$, from which an endless belt X' extends to and around a large pulley $X^2$ on the shaft $w$, which shaft also bears a smaller pulley $x'$, from whence leads a belt $x^2$ to a source of power (Not shown.) The projecting rear ends of the extensions $w^2$ of the bifurcated rod W are each provided with a weight $w^3$ to counterbalance the forward projecting end of the rod W and the flexible shaft X. It is necessary, however, that the driving mechanism be more or less flexible, and a directly-connected single belt, such as has been heretofore commonly used in carving-machines, cannot be employed in our machine, since any movement of the driven cutting-tool toward the driving-pulley would slacken the belt and diminish or check the motion of the tool.

We adopt the device of the flexible shaft shown and described herein in lieu of a single belt or other power-transmitter which does not permit the free movement of the cutting-tool from back to front and side to side of the work-table without interfering with the motion of the cutting-tool. The necessary speed of rotation imparted to this tool is very great, and though it depends upon and varies with the material worked and size of tool employed we have found that ordinary woods are best treated with tools not larger than a quarter to five-sixteenths of an inch (and in finishing much smaller tools are used) and running at a speed of from ten thousand to fifteen thousand revolutions per minute. To maintain this high speed it is desirable to have the most effective means of transmission possible, and in order to make the machine delicate in movement the traveling parts must be light, as otherwise the momentum of these parts in their movement would interfere with fine work. It will of course be understood, also, that any suitably-constructed frame-work may be employed to support and carry the operative mechanism of our machine, and the words "timber" and "timbers," &c., occurring in the specification are intended to include any corresponding or equivalent parts of a frame of metal or other material that may be adopted.

Y is the operating-table, the preferred form of which is shown in detail in Fig. 15, and which is cut out to receive two circular plates $y$ $y$ flush with the top thereof and having downwardly-extending hubs $y'$ $y'$, slots $y^2$ $y^2$, and holes for central removable screw-points $y^3$. The table is supported on the front projecting portions of the longitudinal horizontal timbers B' B', and bolted to the undersides of said timbers is a transverse timber $B^2$, to which are attached the boxes $b^2$ $b^2$ of the vertical spindles Z Z and the lug $b'$, carrying a downward-projecting stud $b^3$, which supports an intermediate gear Z', meshing with the gears $Z^2$ $Z^2$, which are fast upon the vertical spindles Z Z, which latter are stepped in a base-plate $z$, and to whose upper portions the hubs $y'$ of the plates $y$ are also secured, while the removable screw-points $y^3$ are fastened in the tops of these spindles. Thus any movement of one spindle will produce a corresponding movement in the other, and the two attached plates $y$ $y$ will always move together equally.

We will next proceed to describe the operation of our machine. As already described, the guiding-tool and cutting-tool are so connected that any movement of one will be faithfully duplicated by the other, the said movement being wholly unrestricted in direction and limited only in extent. The preferred cutting-tool R' is a sphere pierced by a cylindrical hole of diameter smaller than the sphere, tangent to the sphere at one point, and two of the edges of the hole thus formed being made cutting-edges, and the rest of the spherical surface cut away to form a clearance, while the guiding-tool is necessarily of the same outline as the cutting-tool before the hole and cutting-edges are formed in the latter. For carving objects in high relief—groups of statuary, figures, &c.—we place the model or pattern upon the plate $y$ under the guiding-tool and fasten the screw-point $y^3$ firmly into the top of the corresponding vertical spindle Z and into the base of said model, as clearly indicated at the right in Fig. 15, and, if necessary, additional screws may be inserted from below the plate, through the slots $y^2$ therein, into the base of said model or pattern, and then upon the other plate $y$ below the cutting-tool the block to be carved is similarly secured, (said block being preferably roughly cut into the general outlines of the model, so as to remove wholly the superfluous material,) and then the guiding-tool is held by the operator and passed over the model, so as to bring it into contact with every portion of the surface thereof, the cutting-tool making the same motions simultaneously, and as the latter is revolved at the necessary speed, (according to the material being carved,) by means of the power transmitted through the belt X', flexible shaft X, and attachments, the said tool will cut out the block into the exact configuration of the model. When the surface nearest the operator is entirely carved, he has only to grasp one of the gear-wheels $Z^2$ and give it a slight movement to bring a fresh surface of both model and block before him, and thus he can always work to the greatest advantage with the part of the model to be copied and block to be carved directly in front of him. When a panel, bas-relief, or other flat object is to be carved, the model and block are simply fastened in place on the table Y and carved as before, except that in such instances the said model and block do not have to be rotated. In case a very long object is to be carved we find it expedient to remove the screw-points $y^3$ and employ an auxiliary table (merely a flat board) placed on top of the table Y, and with the model and block secured to said auxiliary table, so that the design can be copied in sections within the limits of movement of the tool-rod and attachments, and in order to insure the perfectly-straight movement of the auxiliary table when it is to be moved to bring a fresh section into place, we prefer to employ an ordinary adjustable gage of any suitable construction, as shown at Y′ in Figs. 2 and 3, to make a straight-edged guide for said auxiliary table. When operating on long pieces whose periphery is to be carved—as, for example, furniture-legs, stair-posts, canes, umbrella-handles, and the like—a modification in the arrangement of the operating-table is necessary and illustrated in Figs. 18, 19, and 20. This change is practically merely substituting a vertical position of the parts for their former horizontal position, and vice versa, the gear-wheels $Z^2$ $Z^2$ and intermediate gears Z′ and plates $y$ being vertically arranged, while the spindles Z and shaft $b^3$ (which takes the place of stud $b^3$) are now horizontal. When the model and piece to be carved are of moderate length, no further support than that offered by the screw-points $y^3$ and screws through the slots in the plates $y$ is necessary; but if the said model and block are unusually long and heavy it becomes essential to provide a support for their opposite ends, as indicated in Figs. 18 and 20, and to this purpose (and to further provide for varying lengths of the articles to be carved) the upper surface of the table $Y^2$ (which takes the place of table Y and rests on the longitudinal timbers B′ B′) is provided with two longitudinal ⊥-slots $y^4 y^4$, which receive tongues $b^4$, depending from the bases of the boxes $b^2$, and similar tongues $b^5$, depending from the bases of the foot-stocks $b^6$, which carry the centers $b^7$, so that the said foot-stocks may be moved within the said slots to any point to or from the plates $y$ necessary on account of the length of the model and block and then fastened at the desired point by tightening the T-bolt $b^8$, as shown best in detail view, Fig. 20, while by reason of the described slots $y^4$ the centers $y^3$ and $b^7$ will always be kept in line. For greater convenience in operating the gears $Z^2$ $Z^2$ to turn the model and block the shaft $b^3$ of the intermediate gear Z′ is extended to beneath the front of the table $Y^2$ and there supported in suitable bearings $b^9$ and provided with a hand-wheel $b^{10}$.

In order to accommodate the table $Y^2$ to work which is so long as to require to be done in sections, the said table may be grooved, as at $y^5$, on the under side, so as to rest upon suitable tracks $B^3$, secured to the upper surfaces of the timbers B′, and thus the table may be moved back and forth, after the fashion of the auxiliary table hereinbefore described, for accomplishing a like purpose with flat work, the described grooves and tracks serving the purpose of the gage Y′ in section work.

While we have described our two parallel motions as "vertical" and "horizontal," respectively, this was merely for convenience, and we wish it understood that our said combined two motions may be suspended at any variation to a right angle found convenient in any given instance, or that either motion may be suspended at any desired inclination.

We wish it to be understood that we do not relinquish our claim to features of the machine shown and described in this application which are made the subject-matter of claims in our application, Serial No. 270,072, filed April 9, 1888, and in our application, Serial No. 323,995, filed September 16, 1889.

Having thus fully described our invention, what we claim as new, and desire to secure by Letters Patent, is—

1. The combination, in a carving-machine, of a pattern aside from the block to be cut, a movable cutting-tool, a guiding-tool so connected therewith that its movement over said pattern will produce a similar simultaneous movement of said cutting-tool, and a flexible shaft connecting said cutting-tool with a source of power, substantially as and for the purposes set forth.

2. The combination, in a carving-machine, with a suitable frame, of connected movable hand-pieces or tool-holders, guiding mechanism connecting said tool-holders with said frame and with each other, so that the movement of one will produce a similar and simultaneous movement of the other, a guiding-tool and a cutting-tool carried by said holders, and a flexible shaft connecting said cutting-tool with a source of power, substantially as and for the purposes set forth.

3. In a carving-machine, the combination of a suitable supporting-frame, two parallel motions supported thereby, a rod connecting said parallel motions with each other at an angle, a guiding-tool and a cutting-tool controlled in travel by the parallel motions, and mechanism for imparting motion to the cutting-tool.

4. The combination, in a carving-machine, of a suitable frame, freely-movable hand-pieces or tool-holders so constructed and connected as to cause them to describe similar simultaneous movements, a removable guiding and a removable cutting tool carried by said tool-holders, and a flexible shaft connecting said cutting-tool with a source of power, substantially as and for the purposes set forth.

5. In a carving-machine, the combination, with a suitable supporting-frame, of a tool-carriage, a parallel motion connected with the frame and tool-carriage and movable directly backward and forward, a second parallel motion independently connected with the frame and also connected with the tool-carriage and capable of movement vertically and backward and forward, and a guiding-tool and a cutting-tool connected with each other, so that the movement of the guiding-tool over a pattern shall produce similar movements of the cutting-tool, substantially as and for the purpose set forth.

6. In a carving-machine, the combination, with a suitable frame, of a tool-carriage, a parallel motion connected therewith, a guiding-tool and a cutting-tool connected with said carriage, and a flexible shaft connecting the cutting-tool and a proper source of power, substantially as and for the purposes set forth.

7. In a carving-machine, the combination, with a suitable supporting-frame, of a tool-carriage, two parallel motions connected with and governing the movements of said tool-carriage in intersecting planes, a guiding-tool and a cutting-tool connected with said tool-carriage, and a flexible shaft connecting the cutting-tool with a proper source of power, substantially as and for the purposes set forth.

8. In a carving-machine, the combination, with a suitable supporting-frame, of a tool-carriage, a parallel motion connected therewith and so constructed as to permit the free movement of said tool-carriage while the latter is kept constantly parallel to a fixed line, a guiding-tool and a cutting-tool connected with each other and with the tool-carriage by a jointed connection permitting the simultaneous movement of the same and permitting the inclination of the cutting-tool at a varying angle to the tool-carriage, and mechanism for imparting motion to the cutting-tool, substantially as and for the purposes set forth.

9. In a carving-machine, the combination, with a suitable supporting-frame, of a tool-carriage, a parallel motion connected therewith and so constructed as to permit the free movement of said tool-carriage while the latter is kept constantly parallel with a fixed line, a guiding and cutting tool connected with each other and with the tool-carriage by a universally-jointed connection permitting the simultaneous movement of the same and the inclination of the cutting-tool at any angle to the tool-carriage, and mechanism for imparting motion to the cutting-tool, substantially as and for the purposes set forth.

10. In a carving-machine, the combination, with a suitable supporting-frame, of a tool-carriage, two parallel motions connected therewith and governing the movement thereof in intersecting planes, a guiding-tool and a cutting-tool connected with each other so that the movement of the guiding-tool over a pattern shall produce similar movements in the cutting-tool, said tools being adjustably connected with the tool-carriage in such a manner that the cutting-tool can be inclined to the work and to the tool-carriage, and mechanism for imparting motion to the cutting-tool, substantially as and for the purposes set forth.

11. In a carving-machine, the combination, with a suitable supporting-frame, of a tool-carriage, two parallel motions connected therewith and governing its movement in intersecting planes, and a guiding-tool and a cutting-tool connected with each other so that the movement of the guiding-tool over a pattern shall produce similar movements in the cutting-tool, said tools being attached by a universal-joint connection to the tool-carriage, substantially as and for the purposes set forth.

12. In a carving-machine, the combination, with a suitable frame, of a tool-carriage, a parallel motion connected therewith, a guiding-tool and a cutting-tool pivotally connected with the tool-carriage, a connection from one tool to the other, and a flexible power-transmitter connecting the cutting-tool with a source of power, said parts being arranged substantially as set forth, whereby the movement of the guiding-tool over a pattern is caused to produce like movements of the cutting-tool and said cutting-tool is rendered capable of inclination.

13. In a carving-machine, the combination, with a suitable frame, of a tool-carriage, a parallel motion connected therewith, a guiding-tool and a cutting-tool connected with the tool-carriage by a universal-joint connection and connected with each other so that the movement of the guiding-tool over a pattern shall produce similar movements in the cutting-tool, and a flexible power-transmitter connecting the cutting-tool with a suitable source of power, substantially as and for the purposes set forth.

14. In a carving-machine, the combination, with a suitable frame, of a tool-carriage, two parallel motions connected therewith, a guiding-tool and a cutting-tool pivotally connected with the tool-carriage, a connection from one tool to the other, and a flexible power-transmitter connecting the cutting-tool with the source of power, said parts being arranged substantially as set forth, whereby the movement of the guiding-tool over a pattern is caused to produce like movements of the cutting-tool and said cutting-tool is rendered capable of inclination.

15. In a carving-machine, the combination, with a suitable supporting-frame, of a tool-carriage, two parallel motions connected therewith and governing the movements of said tool-carriage in intersecting planes, a guiding and a cutting tool connected with the tool-carriage by a universal-joint connection and connected with each other so that the movement of the guiding-tool over a pattern shall produce similar movements in the cutting-tool, said cutting-tool being capable of inclination at any angle to the tool carriage or work, and a flexible power-transmitter connecting the cutting-tool with a suitable source of power, substantially as and for the purposes set forth.

16. In a carving-machine, the combination, with a suitable frame, of a pattern, a movable cutting-tool, a guiding-tool so connected therewith that its movement over said pattern will produce a similar simultaneous movement of said cutting-tool, a flexible shaft connecting said cutting-tool with a source of power, and a sliding work support or table, substantially as and for the purposes set forth.

17. In a carving-machine, the combination, with a suitable supporting-frame, of a tool-carriage, a parallel motion connected therewith and so constructed as to permit the free movement of said tool-carriage while keeping it constantly parallel with a fixed line, a guiding and a cutting tool so connected with the tool-carriage as to cause the movement of the guiding-tool over the pattern to produce similar simultaneous movements of the cutting-tool, a flexible shaft connecting the cutting-tool with a source of power, and a sliding work support or table, substantially as and for the purposes set forth.

18. In a carving-machine, the combination, with a suitable supporting-frame, of a tool-carriage, two parallel motions connected therewith and governing its movements in intersecting planes, a guiding-tool and a cutting-tool connected with each other so that the movement of the guiding-tool over a pattern will produce similar movements of the cutting-tool, a flexible shaft connecting the cutting-tool with a source of power, and a sliding work support or table, substantially as and for the purposes set forth.

19. In a carving-machine, the combination, with a suitable frame, of a tool-carriage, a parallel motion connecting the same with said frame, connected guiding and cutting tools having a jointed connection with the tool-carriage permitting their simultaneous movement and the inclination of the cutting-tool to said carriage, mechanism for imparting motion to the cutting-tool, and a sliding work support or table, substantially as and for the purposes set forth.

20. In a carving-machine, the combination, with a supporting-frame, of a tool-carriage, a parallel motion connecting the same with said frame, connected guiding and cutting tools having a universal-joint connection with said tool-carriage, and a sliding work support or table, substantially as and for the purposes set forth.

21. In a carving-machine, the combination, with a suitable supporting-frame, of a tool-carriage, a parallel motion connecting the same with said frame, connected guiding and cutting tools having a jointed connection with the tool-carriage permitting their inclination thereto, a flexible power-transmitter connecting said cutting-tool with a source of power, and a sliding work support or table, substantially as and for the purposes set forth.

22. In a carving-machine, the combination, with a supporting-frame, of a tool-carriage, a parallel motion connecting the same with said frame, connected guiding and cutting tools having a universal-joint connection with said carriage, a flexible power-transmitter connecting said cutting-tool with a source of power, and a sliding work-support, substantially as and for the purposes set forth.

23. In a carving-machine, the combination, with a pattern, of a movable cutting-tool, a guiding-tool freely movable over said pattern and producing a similar simultaneous movement of said cutting-tool, an arm or frame having a jointed connection with a suitable support, so as to move in conformity with the movement of said cutting-tool, and a flexible shaft supported by said arm or frame and connected with said cutting-tool, substantially as and for the purposes set forth.

24. In a carving-machine, the combination, with a supporting-frame, of a movable tool-holder having a jointed connection with said frame, a cutting-tool carried by said tool-holder, a pattern-tracing tool so connected with said tool-holder as to cause its movement over the pattern to produce a similar simultaneous movement of the cutting-tool, a flexible power-transmitter connected with said cutting-tool, and an oscillatory frame or arm carrying a driving-pulley and at or near its free end said flexible power-transmitter, substantially as and for the purposes set forth.

25. In a carving-machine, the combination, with a supporting-frame, of a movable tool-holder having a jointed connection with said frame, a cutting-tool carried by said tool-holder, a pattern-tracing tool so connected with said tool-holder as to cause its movement over the pattern to produce a similar simultaneous movement of the cutting-tool, a flexible power-transmitter connected with said cutting-tool, an oscillatory frame or yoke carrying a driving-wheel, and an extensible vibratory arm connected therewith and carrying said flexible power-transmitter in conformity with the movement of said tool-holder, substantially as and for the purposes set forth.

26. In a carving-machine, the combination, with a supporting-frame, of a movable tool-holder having a jointed connection with said frame, a cutting-tool carried by said holder, a pattern-tracing tool so connected with said tool-holder as to cause its movement over the pattern to produce a similar simultaneous movement of the cutting-tool, a flexible shaft connected with said cutting-tool, a vibratory arm carrying said flexible shaft in conformity with the movement of said tool-holder, and a sliding work support or table, substantially as and for the purposes set forth.

27. In a carving-machine, the combination, with a supporting-frame, of a tool-carriage, a parallel motion connecting the same with said frame, connected guiding and cutting tools having a jointed connection with said carriage permitting their inclination thereto, a flexible shaft connected with the cutting-tool, and a vibratory arm carrying said flexible shaft in conformity with the movement of said tool-holder, substantially as and for the purpose set forth.

28. In a carving-machine, the combination, with a suitable frame, of a tool-carriage, a parallel motion connecting the same with said frame, connected guiding and cutting tools having a universal-joint connection with said carriage, a flexible shaft connected with the cutting-tool, and a vibratory arm carrying said flexible shaft in conformity with the movement of the tool-carriage, substantially as and for the purposes set forth.

29. In a carving-machine, the combination, with a suitable frame, of a tool-carriage, two parallel motions connecting the same with said frame, connected guiding and cutting tools having a jointed connection with said tool-carriage permitting their inclination thereto, a flexible shaft connected with the cutting-tool, and a vibratory arm carrying said flexible shaft in conformity with the movement of said tool-carriage, substantially as and for the purposes set forth.

30. In a carving-machine, the combination, with a suitable frame, of a tool-carriage, two parallel motions connecting the same with said frame, connected guiding and cutting tools having a universal-joint connection with said carriage, a flexible power-transmitter connected with the cutting-tool, and a vibratory arm carrying said flexible power-transmitter in conformity with the movement of said tool-carriage, substantially as and for the purposes set forth.

31. In a carving-machine, the combination of a guiding mechanism constructed with three rods having a jointed connection, the bifurcated extremity of one rod being formed with internal and external conical depressions in the same axial line, conical-tipped stems passing through the ends of the other two rods into said conical depressions, a suitable frame, a tool-holder, a guiding-tool, cutting-tool, and mechanism for driving the latter, substantially as and for the purposes set forth.

32. In a carving-machine, the combination, with a supporting-frame, of a movable tool-holder having a jointed connection with said frame, a cutting-tool and a guiding-tool carried by said holder, an oscillatory yoke carrying a driving-wheel, a vibratory arm supported by said yoke and arranged to swing on an axis at right angles to that of said yoke, and a flexible power-transmitter carried by said arm and connected with said cutting-tool, substantially as and for the purposes set forth.

33. In a carving-machine, the combination of a suitable supporting-frame, two parallel motions suspended therefrom and connected to each other by a horizontal rod, a yoke suspended from said rod carrying a pivoted guiding-tool and a pivoted cutting-tool fastened together so as to move equally and simultaneously, a flexible shaft connected to the cutting-tool, and actuating mechanism, substantially as described.

34. In a carving-machine, the combination of two suspended parallel motions, a tool-rod connecting them to each other at a suitable angle and carrying brackets rigidly secured thereto, a yoke pivotally secured to said brackets and having tool-holders pivoted thereto carrying a cutting and a guiding tool, an upright projection on the holder of each tool, a cross-bar pivotally connecting the said upright projections, and a rotating flexible shaft connected to the cutting-tool, substantially as set forth.

35. In a carving-machine, the combination of a yoke consisting of a transverse rigid bar with an open frame at each end rigid therewith, a tool-holder pivotally secured within each open frame, an upright projection rising from each tool-holder bifurcated at the upper end, a cross-bar extending from one projection to the other and pivotally secured by bearing-screws at each end between said bifurcations, and a shank or hand-piece depending from each tool-holder, one having a cutting-tool and the other a guiding-tool attached thereto, and the shank of the cutting-tool attached to a rotating flexible shaft, substantially as set forth.

36. In a carving-machine, the combination of a suitable frame, a vertical yoke having pivotal bearings in the rear timbers thereof, a rod bifurcated at its rear end and thence extending back of the frame, the bifurcated ends pivoted on bosses on the side pieces of yoke and the front portion of the rod being in two parts united by a sleeve and adjusting set-screws and beyond that being hollow and projecting in front of the frame, a shaft pivoted within the yoke and carrying a large and small pulley-wheel, a shaft-bearing having a shank loosely fitted within the front end of the hollow rod, a flexible shaft supported by said bearing and having at its upper end a horizontally-arranged pulley connected thereto, an endless belt connecting said pulley with the large pulley on the shaft in the yoke, another belt running from the small pulley on the shaft in the yoke to source of power, guiding mechanism, cutting mechanism connected to the end of the flexible shaft, and weights on the rear ends of the bifurcated rod to counterbalance the weight of its forward portion and attachments, substantially as set forth.

37. In a carving-machine, the combination of a suitable frame, a vertical yoke having pivotal bearings in the rear timbers thereof, a long bent rod having a cross-rod integral therewith supported by pivotal bearing-screws passing through the side pieces of the yoke, the said long rod extending back of the frame and also beyond the front thereof, two parallel motions suspended from the front timbers of the frame and united by a tool-rod with cutting and guiding devices depending therefrom, a cord connecting the said tool-rod to the front end of the long rod, and a weight on the rear end of the latter for counterbalancing the weight of the parallel motions and attachments, substantially as set forth.

38. In a carving-machine, a suspended vertical parallel motion consisting of the brackets $d\ d$, secured to a cross-timber of the supporting-frame, wall-rod F, supported between said brackets by pivotal bearing-screws $d'$, bifurcated clips $e$, rigidly secured to the rod, castings $e^2$, pivoted between the bifurcated ends of the castings by bearing-screws $e'$, side rods G G, whose upper ends are rigidly secured to the castings $e^2$ and whose lower ends are similarly secured to the castings $g$, having double-pointed pins $h$ rigidly embedded in their lower ends, castings $g'$, whose upper ends are bifurcated and split, said bifurcations being provided with inner countersinks to receive the points of the pins $h$ and having outer countersinks in line therewith, double central cross-rod H H, having end pieces I I' rigidly secured thereto, said end pieces being pivotally secured to the castings $g'$ by bearing-screws $i$ in line with the pins $h$, cross-rods G' G', whose upper ends are rigidly secured to the lower ends of the castings $g'$ and whose lower ends are rigidly secured to the upper ends of the castings $p$, bifurcated swivel-pieces O, pivotally secured to the lower ends of the castings $p$ by bearing-screws $n$, castings N, having upward projections $j$, pivotally secured to the lower central parts of the swivel-pieces O by bearing-screws $j'$, and tool-rod J, rigidly secured to said lugs N, substantially as set forth.

39. In a carving-machine, the combination of a suspended vertical parallel motion, consisting of a wall-rod F, side rods G G and G' G'. double central cross-rod H H, and tool-rod J, united by castings and conical-pointed bearing-screws, swivel-pieces O, and castings N with a suspended horizontal parallel motion, consisting of wall-rod K, side rods L L, double central cross-rod M, castings and conical-pointed bearing-screws, and side rods L' L', united to the tool-rod J by right-angled castings $m$, whose horizontal arms are rigidly united to the ends of said rods L' and whose vertical arms are provided with countersinks to receive bearing-screws $l'$, passing through horizontally-extending lugs $l$ on the castings N, rigidly secured to said tool-rod J, substantially as set forth.

40. In a carving-machine, the combination, with a suitable supporting-frame, of a tool-carriage provided with a guiding and a rotary cutting tool, a parallel motion consisting of a double-jointed parallelogram having variable angles and hinged at one side to said frame and connected at the opposite side with said tool-carriage, so as to permit of the free movement of said carriage and at the same time maintain it constantly parallel with the axis on which said parallelogram swings, and a flexible shaft connecting the cutting-tool with a suitable source of power, substantially as and for the purposes set forth.

41. In a carving-machine, the combination, with a suitable supporting-frame, of a tool-carriage provided with a guiding and a rotary cutting tool, two parallel motions consisting each of a double parallelogram having variable angles and connected at one side with said tool-carriage and hinged at the opposite side to said frame in a line parallel with the axis of said carriage, so as to permit of the free movement of said carriage and maintain it constantly parallel with the axes on which said parallelograms swing, and a flexible shaft connecting said cutting-tool with a source of power, substantially as and for the purposes set forth.

42. In a carving-machine, the combination, with a suitable supporting-frame, of an oscillatory tool-carriage provided with a guiding and a rotary cutting tool pivoted to said tool-carriage and connected with each other so as to be turned simultaneously into various inclinations to the axis of said tool-carriage, two parallel motions consisting each of a double parallelogram hinged on opposite sides to said tool-carriage and to said frame, respectively, the sides of said parallelograms being jointed together at the ends, so as to permit of the variation of the included angles and thereby permit of the free endwise and lateral movement of said carriage and maintain its axis constantly parallel with the axes on which said parallelograms swing, and a flexible shaft connecting said cutting-tool with a source of power, substantially as and for the purposes set forth.

43. In a carving-machine, a head having apertures to receive spindle-carriers and rods for suspending said head, in combination with pivot-yokes connecting said head and rods, substantially as and for the purposes set forth.

44. In a carving-machine, a spindle-carrier pivoted in a head and connected at the upper end with a hand-piece, so that any movement of the hand-piece is imparted to the spindle-carrier, substantially as and for the purposes set forth.

45. In a carving-machine, a head having apertures for the reception of spindle-carriers and vertical rods for suspending said head, and connected therewith by universal joints, in combination with a supporting-frame from which said vertical rods are suspended, said rods and supports being connected by universal joints, substantially as and for the purposes set forth.

46. In a carving-machine, the combination, with an apertured head, a spindle-carrier pivoted therein, and a hand-piece connected with said spindle-carrier, of vertical rods suspending said head and connected therewith by universal joints, substantially as and for the purposes set forth.

In testimony that we claim the foregoing we have hereunto set our hands, at Reedsburg, in the county of Sauk and State of Wisconsin, in the presence of two witnesses.

THOMAS L. SMITH.
PAUL W. POST.

Witnesses:
GEO. T. MORSE,
JAS. MILES.